United States Patent
Chang et al.

(10) Patent No.: US 8,447,429 B2
(45) Date of Patent: May 21, 2013

(54) APPARATUS AND METHOD FOR BALANCING AND DAMPING CONTROL IN WHOLE BODY COORDINATION FRAMEWORK FOR BIPED HUMANOID ROBOT

(75) Inventors: Young-Hwan Chang, Seoul (KR); Yong Hwan Oh, Seoul (KR); Doik Kim, Seoul (KR); Youngjin Choi, Seoul (KR); Bum-Jae You, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 184 days.

(21) Appl. No.: 12/809,004

(22) PCT Filed: Dec. 21, 2007

(86) PCT No.: PCT/KR2007/006750
§ 371 (c)(1),
(2), (4) Date: Jul. 30, 2010

(87) PCT Pub. No.: WO2009/078499
PCT Pub. Date: Jun. 25, 2009

(65) Prior Publication Data
US 2011/0196532 A1    Aug. 11, 2011

(30) Foreign Application Priority Data

Dec. 17, 2007 (KR) .................. 10-2007-0132416

(51) Int. Cl.
*G05B 19/04* (2006.01)
*G05B 19/18* (2006.01)
*G05B 15/00* (2006.01)
*G05B 19/00* (2006.01)

(52) U.S. Cl.
USPC ............... 700/254; 700/261; 901/1; 901/2; 901/9; 901/48; 901/50

(58) Field of Classification Search
USPC ............ 901/1–50; 318/560–586; 700/1, 700/28, 31, 38, 45, 61, 62, 79, 245–253, 700/261, 279, 280, 305, 254
See application file for complete search history.

(56) References Cited

U.S. PATENT DOCUMENTS 5,151,859 A   9/1992 Yoshino et al.
5,337,235 A   8/1994 Takahashi et al.
(Continued)

FOREIGN PATENT DOCUMENTS

JP   10-217161 A   8/1998
JP   2002-361574 A   12/2002
(Continued)

OTHER PUBLICATIONS

Park, Jong Hyeon, Impedance Control for Biped Robot Control, Dec. 2001, IEEE Transactions on Robotics and Automation, vol. 17 No. 6, pp. 870-882.*

(Continued)

*Primary Examiner* — Khoi Tran
*Assistant Examiner* — Abby Lin
(74) *Attorney, Agent, or Firm* — Fenwick & West LLP (57) ABSTRACT

Apparatus and a method for balancing and damping control in whole body coordination framework for a biped humanoid robot. The method comprises the steps of: (a) damping the structural vibration of the main body of the robot caused when the robot walks; (b) compensating for the trajectories of the zero moment position (ZMP) and the center of mass (COM) of the robot which changes in accordance with the damping of the structural vibration; and (c) compensating for the body orientation of the robot which changes in accordance with the damping of the structural vibration and the trajectory of the COM.

4 Claims, 7 Drawing Sheets

U.S. PATENT DOCUMENTS

| | | | |
|---|---|---|---|
| 5,355,064 A * | 10/1994 | Yoshino et al. | 318/568.12 |
| 5,404,086 A | 4/1995 | Takenaka et al. | |
| 5,432,417 A | 7/1995 | Takenaka et al. | |
| 5,479,079 A * | 12/1995 | Jeong et al. | 318/568.12 |
| 5,808,433 A | 9/1998 | Tagami et al. | |
| 5,872,893 A | 2/1999 | Takenaka et al. | |
| 5,936,367 A | 8/1999 | Takenaka | |
| 6,943,520 B2 * | 9/2005 | Furuta et al. | 318/568.12 |
| 7,386,364 B2 | 6/2008 | Mikami et al. | |
| 2004/0051493 A1 * | 3/2004 | Furuta et al. | 318/568.12 |
| 2004/0164697 A1 * | 8/2004 | Iribe | 318/568.12 |
| 2005/0055131 A1 * | 3/2005 | Mikami et al. | 700/245 |
| 2005/0065646 A1 * | 3/2005 | Takenaka et al. | 700/245 |
| 2005/0113973 A1 * | 5/2005 | Endo et al. | 700/245 |
| 2005/0165507 A1 * | 7/2005 | Shimizu et al. | 700/245 |
| 2005/0267630 A1 * | 12/2005 | Kajita et al. | 700/245 |
| 2007/0016329 A1 * | 1/2007 | Herr et al. | 700/250 |
| 2008/0281469 A1 * | 11/2008 | Choi et al. | 700/253 |
| 2010/0161118 A1 * | 6/2010 | Kwak et al. | 700/245 |

FOREIGN PATENT DOCUMENTS

| | | |
|---|---|---|
| JP | 2004-114243 A | 4/2004 |
| JP | 2004-174653 A | 6/2004 |
| JP | 2004-298983 A | 10/2004 |
| KR | 10-2004-0108526 A | 12/2004 |
| KR | 10-0709556 B1 | 4/2007 |
| KR | 10-0763521 B1 | 10/2007 |
| WO | WO 2007/046568 A1 | 4/2007 |

OTHER PUBLICATIONS

Park, Ill-Woo et al, Online Biped Walking Pattern Generation for Huamoid Robot KHR-3(KAIST Huamnoid Robot-3: HUBO), Dec. 4-6, 2006, 2006 6th IEEE-RAS International Conference on Humanoid Robots, pp. 398-403.*

Hyon, Dang-Ho et al Gravity Compensation and Full-Body Balancing for Humanoid Robots, IEEE 2006 Humanoids' 06, pp. 214-221.*

Loffler et al, Sensors and Control Concept of Walking "Johnnie", Mar.-Apr. 2003, International Journal of Robotics Research, pp. 229-239.*

Kim, Jung-Hoon et al, Realization of dynamic walking for the humanoid robot platform KHR-1, 2004, Advanced Robotics, vol. 18, No. 7 pp. 749-768, VSP and Robotics Society of Japan 2004.*

Choi, Youngjin et al, On the Walking Control for Humanoid Robot based on the Kinematic Resolution of CoM Jacabian with Embedded Motion, May 2006, Proceedings of the 2006 IEEE International Conference on Robotics and Automation, pp. 2655-2659.*

R. Caballero et al., "Robust Cascade Controller for ROBICAM Biped Robot: Preliminary Experiments," Proc. of the $5^{th}$ Int. Conf. of Climbing and Walking Robots, pp. 147-154, 2002.

PCT International Search Report and Written Opinion, PCT/KR2007/006750, Sep. 4, 2008, 7 Pages.

* cited by examiner

APPARATUS AND METHOD FOR BALANCING AND DAMPING CONTROL IN WHOLE BODY COORDINATION FRAMEWORK FOR BIPED HUMANOID ROBOT

TECHNICAL FIELD

The present invention relates to an apparatus and a method for balancing and damping control in the whole body coordination framework for a biped humanoid robot, which can reduce structural vibrations and can stabilize the body orientation of the robot by making up for the walking control algorithm for an existing biped walking robot, thereby enhancing the walking stability.

BACKGROUND ART

This application claims all benefits of Korean Patent Application No. 10-2007-0132416 filed on Dec. 17, 2007 in the Korean Intellectual Property Office, the disclosures of which are incorporated herein by reference.

This patent application is an improvement of Korean Patent Application No. 2005-98713, filed by the applicant of the present invention.

A joint actuator for generating an actual motion of robots is an electric-mechanical system composed of an electric motor, a gear, and a link mechanism. The joint actuator is associated with a lot of internal disturbances, such as backlash and ripple, and structural vibrations. Further, since a humanoid robot should be driven in such an environment that the robot coexists with human beings, an unexpected contact with a human being or a contact with the environment can be a source of external disturbance, at any time.

Such disturbances may be an obstacle when humanoid robot actuators follow desired COM (center of mass) and ZMP (zero momentum position) trajectories in the conventional whole body coordination control structure. In a severe case, a humanoid robot may lose stability and fall over.

DISCLOSURE

Technical Problem

Conventional methods relating to biped walking of humanoid robots are known as follows.

First, U.S. Pat. Nos. 5,151,859 and 5,432,417 disclose a method for controlling biped walking by using the ground reaction measured on the feet of a biped walking robot.

Second, U.S. Pat. No. 5,337,235 discloses a method for controlling walking by using the COM movement pattern of a biped walking robot.

Third, U.S. Pat. No. 5,404,086 discloses a method in which, when a biped walking robot walks on the ground with a slight slope in a predetermined walking pattern, the walking pattern is corrected in accordance with the ground slope measured by a slope indicator mounted on the biped walking robot, so as to overcome the instability of the biped walking robot.

Further, U.S. Pat. Nos. 5,808,433, 5,872,893, and 5,936,367 disclose a method for generating a variety of walking patterns in consideration of the motion of the body.

However, the conventional methods do not exhibit a satisfactory effect in terms of stability.

Technical Solution

An advantage of the present invention is that it provides an apparatus and a method for balancing and damping control in the whole body coordination framework for a biped humanoid robot, which can stabilize disturbances and reduce structural vibrations of the robot, thereby stabilizing the walking and body orientation of the robot.

According to an aspect of the invention, a method for balancing and damping control in a whole body coordination framework for a biped humanoid robot comprises the steps of: (a) damping the structural vibration of the main body of the robot caused when the robot walks; (b) compensating for the trajectories of the zero moment position (ZMP) and the center of mass (COM) of the robot which change in accordance with the damping of the structural vibration; and (c) compensating for the body orientation of the robot which changes in accordance with the damping of the structural vibration and the trajectory of the COM.

In step (b), the robot is excited in the frequency band of interest by $\Delta x$ and $\Delta y$ to obtain a transfer function expressed by the following equation, and the transfer function is used to compensate for the ZMP:

$$ZMP_{\Delta x}=a_x x_{\Delta cr}-b_x \ddot{x}_{\Delta cr},\ ZMP_{\Delta y}=a_y y_{\Delta cr}-b_y \ddot{y}_{\Delta cr}$$

where $a_i$ and $b_i$ are parameters of the transfer function.

The method further comprises the step of designing a desired trajectory of the angular velocity of the robot body as expressed by the following equation, thereby stabilizing the body orientation of the robot through feedback control:

$$\omega_{ref}=\omega_d+T(\Phi)\{k_p(\Phi_d-\Phi)+k_I\int(\Phi_d-\Phi)dt\}$$

where $\Phi$ represents the body orientation angle, $\Phi_d$ represents the desired body orientation angle, $k_p$ and $k_I$ represent coefficients of PI control, $T(\Phi)$ represents the transformation matrix, $\omega_{ref}$ represents the reference angular velocity, and $\omega_d$ represents the desired angular velocity.

According to another aspect of the invention, an apparatus for balancing and damping control in a whole body coordination framework for a biped humanoid robot comprises a ZMP controller; a COM controller; a PID controller; a damping controller that damps the structural vibration of the robot body caused when the robot is walking; and a body orientation compensator that compensates for the body orientation of the robot which changes in accordance with the damping of the structural vibration.

The apparatus further comprises a ZMP compensator that compensates for the trajectories of ZMP and COM in accordance with the movement of the robot. The body orientation compensator compensates for the body orientation of the robot on the basis of the damping of the structural vibration and the compensated trajectories of COM and ZMP.

Figure 5:
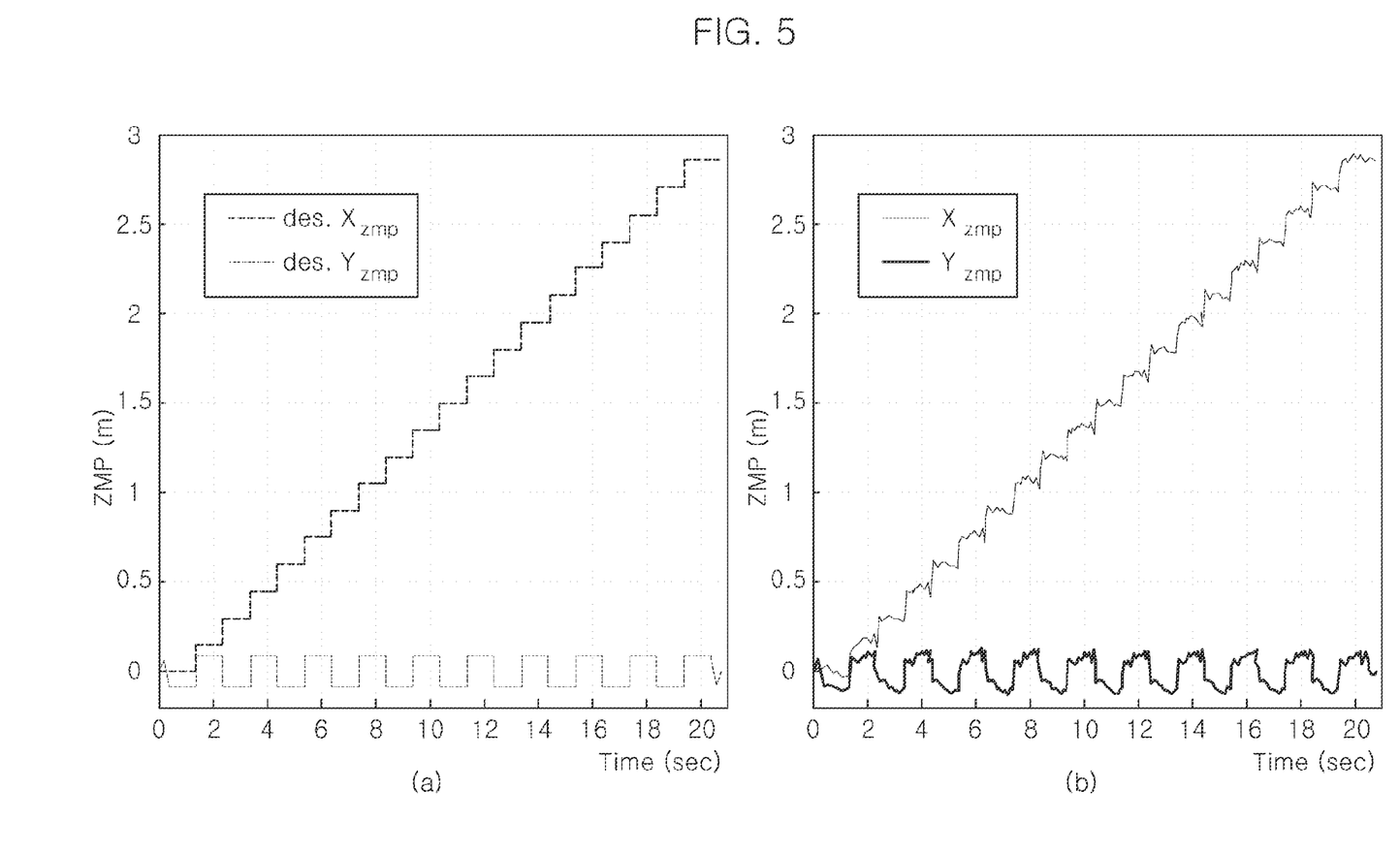
FIG. 5 is a graph showing the desired ZMP and the actually-measured ZMP of the biped walking robot with the robot walking control device according to the invention.

To demonstrate the excellence of the apparatus, an application test has been carried out for a biped walking robot. The test has been applied to a network humanoid robot (name: 'Maru R') developed by the present inventors. An excellent result was attained, as shown in FIG. 5.

In the present invention, the damping controller, the ZMP compensator, and the body orientation compensator are introduced in an existing whole body coordination control structure so as to exhibit a stable control effect with respect to external/internal disturbances.

Advantageous Effects

An advantage of the present invention is that it provides an apparatus and a method for balancing and damping control in the whole body coordination framework for a biped humanoid robot, which can stabilize disturbances and reduce structural vibrations of the robot, thereby stabilizing the walking and body orientation of the robot.

MODE FOR INVENTION

Hereinafter, an embodiment of the present invention will be described with reference to the accompanying drawings. However, the invention is not limited to the embodiment.

Figure 1:
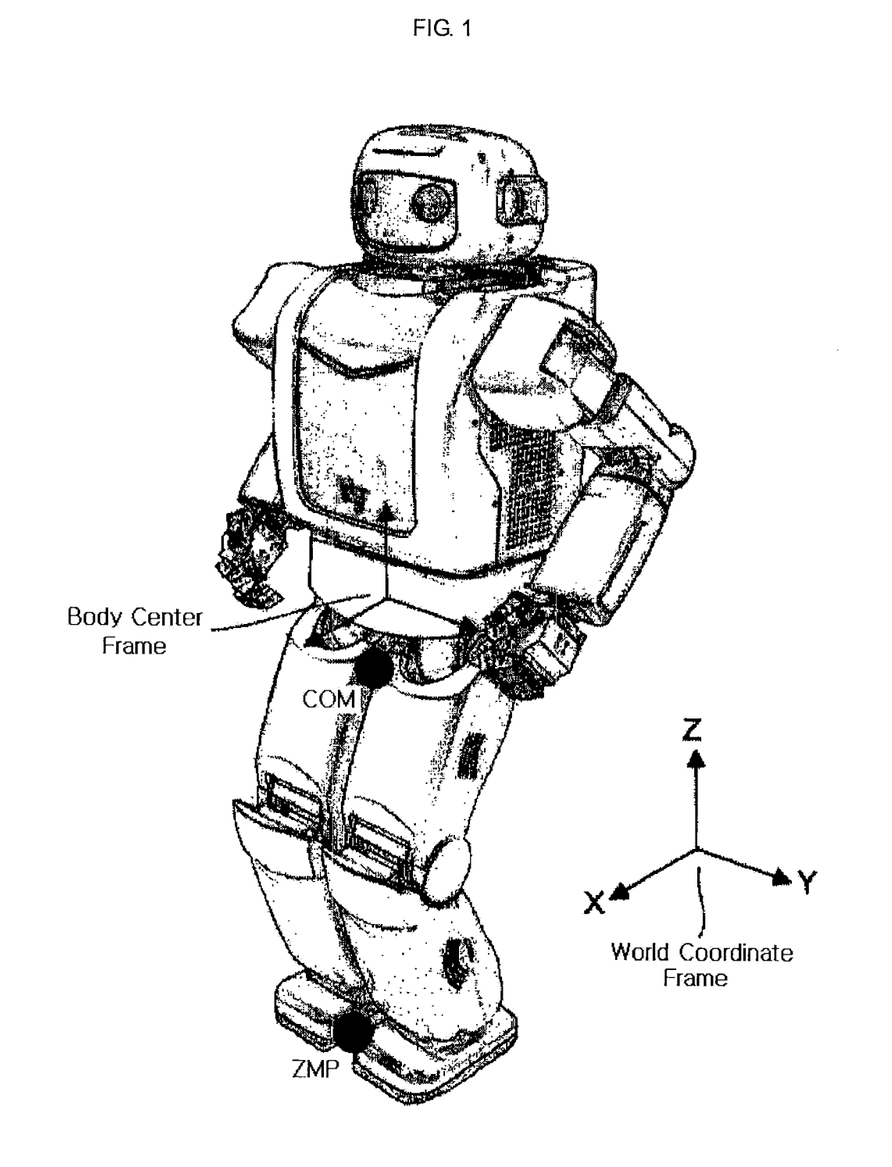
FIG. 1 is a conceptual view of a humanoid biped walking robot.

FIG. 1 is a conceptual view of a humanoid biped walking robot.

First, a simplified model of a humanoid biped walking robot will be described. A biped walking mechanism is an essential part of a humanoid robot as shown in FIG. 1. To realize walking similar to that of human beings, two legs of the humanoid robot should have more than 12 degrees of freedom. Therefore, when a walking controller is designed or walking stability is desired to be demonstrated, there are difficulties in using the entire walking dynamic equation.

As an alternative therefor, a method is generally used, in which the COM of the humanoid robot is computed, and the walking dynamic equation is simplified by using a simplified equation of motion described using the COM as a point mass.

Figure 2:
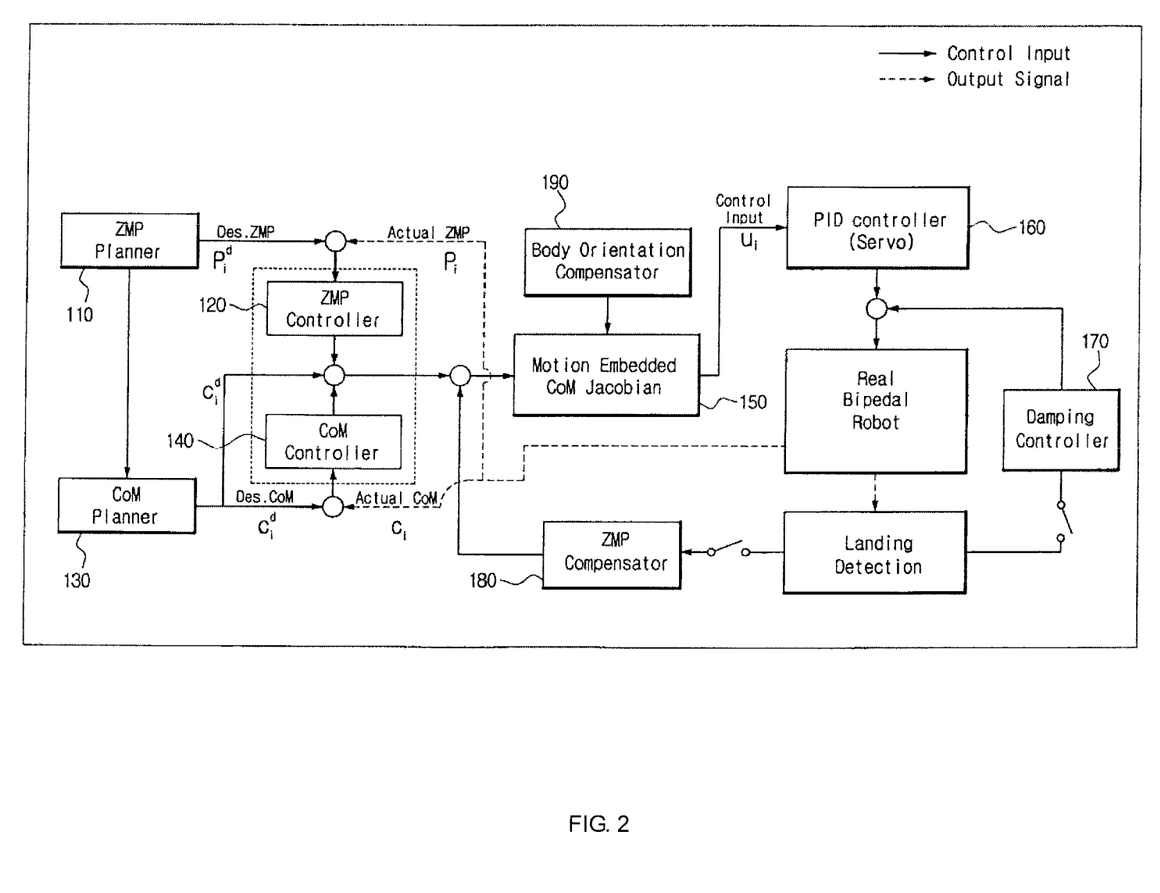
FIG. 2 is a block diagram showing the configuration of a robot walking control device according to an embodiment of the invention.

FIG. 2 is a block diagram showing the configuration of a robot walking control device according to an embodiment of the invention.

Referring to FIG. 2, the robot walking control device according to the invention includes a ZMP planer 110, a ZMP controller 120, a COM planner 130, a COM controller 140, a COM Jacobian 150, a PID controller 160, a damping controller 170, a ZMP compensator 180, and a body orientation compensator 190.

The configuration and operation of the ZMP planner 110, the ZMP controller 120, the COM planner 130, the COM controller 140, the COM Jacobian 150, and the PID controller 160 have been described in detail in Korean Patent Application No. 2005-98713. Therefore, the detailed descriptions thereof will be omitted.

The damping controller 170 serves to apply a control force to the ankle of the humanoid robot for preventing a structural vibration of the humanoid robot when the robot stands on one foot. Accordingly, the damping controller 170 effectively reduces the structural vibration of the robot which occurs when the robot lifts one foot for walking.

Figure 3:
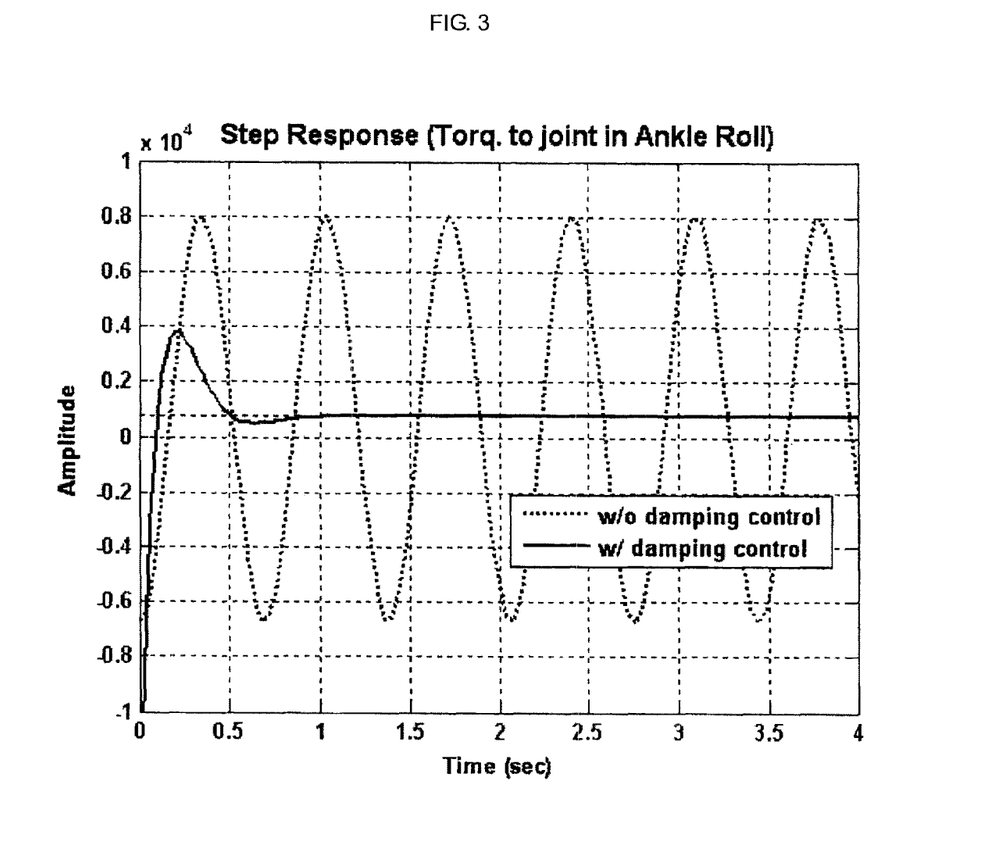
FIG. 3 is a diagram showing vibration damping behaviors when a damping controller is used and when the damping controller is not used, respectively, in case where the robot stands on one foot during walking.

FIG. 3 is a diagram showing vibration damping behaviors when the damping controller is used and when the damping controller is not used, respectively, in case where the robot stands on one foot during walking.

Referring to FIG. 3, it can be found that the overshoot width of the structural vibration is significantly reduced in a robot provided with the damping controller 170 according to the invention, and the magnitude of the vibration is quickly stabilized.

The ZMP compensator 180 serves to compensate for the trajectories of the ZMP and the COM in the robot. That is, the ZMP compensator 180 compensates for desired trajectories of COM and ZMP formed by the ZMP controller 120 and the COM controller 140, respectively, in accordance with a control signal from the damping controller 170.

Figure 4:
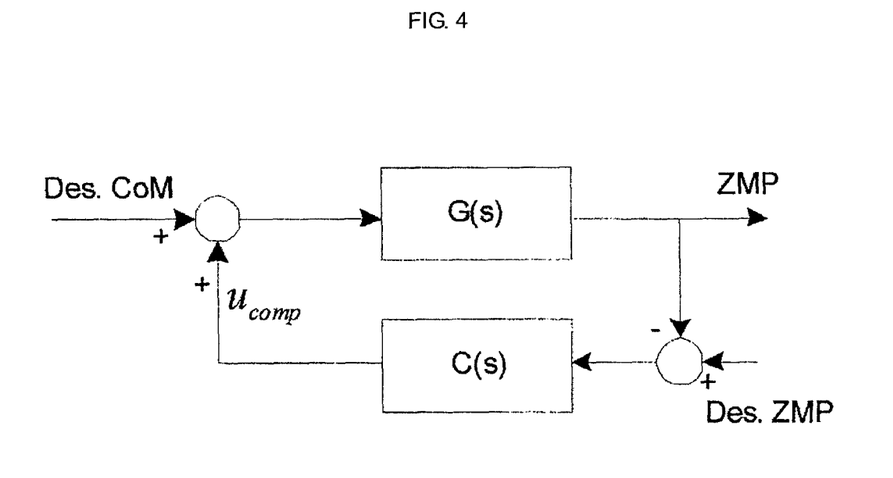
FIG. 4 is a diagram showing the process of compensating the desired trajectories of COM and ZMP formed by a ZMP controller and a COM controller, respectively.

FIG. 4 is a diagram showing the process of compensating the desired trajectories of COM and ZMP formed by the ZMP controller and the COM controller, respectively.

In FIG. 4, G(s) represents a transfer function of COM for ZMP, and C(s) represents a controller for compensating the ZMP.

The transfer function can be obtained by exciting the biped walking robot in the frequency band of interest, as expressed by Equation 1.

$$x_{\Delta c} = x_0 \sin(\omega t), y_{\Delta c} = y_0 \sin(\omega t) \quad \text{[Equation 1]}$$

When the biped walking robot is excited in such a manner, an inverted pendulum model can be constructed on the basis of the measured ZMP, and can be expressed by Equation 2.

$$ZMP_{\Delta x} = x_{0ZMP}\sin(\omega t) = x_{\Delta c} - \frac{1}{\omega_c^2}\ddot{x}_{\Delta c} \quad \text{[Equation 2]}$$

$$ZMP_{\Delta y} = y_{0ZMP}\sin(\omega t) = y_{\Delta c} - \frac{1}{\omega_c^2}\ddot{y}_{\Delta c}$$

where $\omega_c$ is the resonance frequency in the inverted pendulum model.

From Equations 1 and 2, Equation 3 is obtained.

$$x_{0ZMP} = \left(1 + \frac{\omega^2}{\omega_c^2}\right)x_0, \, y_{0ZMP} = \left(1 + \frac{\omega^2}{\omega_c^2}\right)y_0 \quad \text{[Equation 3]}$$

It is difficult to accurately estimate the desired COM because of internal disturbances such as the structural vibration and damping characteristics of an actual biped walking robot.

An estimation error is caused by a lot of internal disturbances such as inaccuracy in mass distribution of an actual biped walking robot, backlash or electric ripple of an electric-mechanical system, and so on.

By using the "Harmonic balance [R. Caballero, T. Akinfiev and M. Armada, "Robust Cascade Controller for ROBICAM Biped Robot: Preliminary Experiments," *Proc. of the 5th Int. Conf. of Climbing and Walking Robots*, pp 147-154. 2002]" method, it is possible to estimate variables for un-modeled dynamic characteristics corresponding to internal disturbances, as expressed by Equation 4.

$$ZMP_{\Delta x} = a_x x_{\Delta cr} - b_x \ddot{x}_{\Delta cr}, ZMP_{\Delta y} = a_y y_{\Delta cr} - b_y \ddot{y}_{\Delta cr} \quad \text{[Equation 4]}$$

where $a_i$ and $b_i$ are parameters of the transfer function.

The transfer function for an uncertain model, which is obtained by such a method, can be used to construct a compensation controller.

The body orientation compensator 190 is a controller for compensating the body orientation of the robot which varies with the damping controller 170 and the ZMP compensator 180. The body orientation compensator 190 follows new target COM and ZMP set by the damping controller 170 and the ZMP compensator 180, thereby stabilizing the body orientation of the robot.

The desired trajectory of the angular velocity of the main body of the biped walking robot is feedback-controlled in a type of PI control, as expressed by Equation 5. Then, it is possible to stabilize the posture of the biped walking robot.

$$\omega_{ref}=\omega_d+T(\Phi)\{k_p(\Phi_d-\Phi)+k_I\int(\Phi_d-\Phi)dt\}$$ [Equation 5]

where $\Phi$ represents the body orientation angle, $\Phi_d$ represents the desired body orientation angle, $k_p$ and $k_I$ are coefficients of PI control, $T(\Phi)$ represents the transformation matrix, $\omega_{ref}$ represents the reference angular velocity, and $\omega_d$ represents the desired angular velocity.

Graph (a) of FIG. 5 shows the desired ZMP and graph (b) of FIG. 5 shows the actually-measured ZMP of the biped walking robot with the robot walking control device according to the invention.

In FIG. 5, the biped walking robot moves straightly in the X-axis direction of FIG. 1. The X-axis ZMP increases stepwise, and the Y-axis ZMP changes with a constant period.

Figure 6:
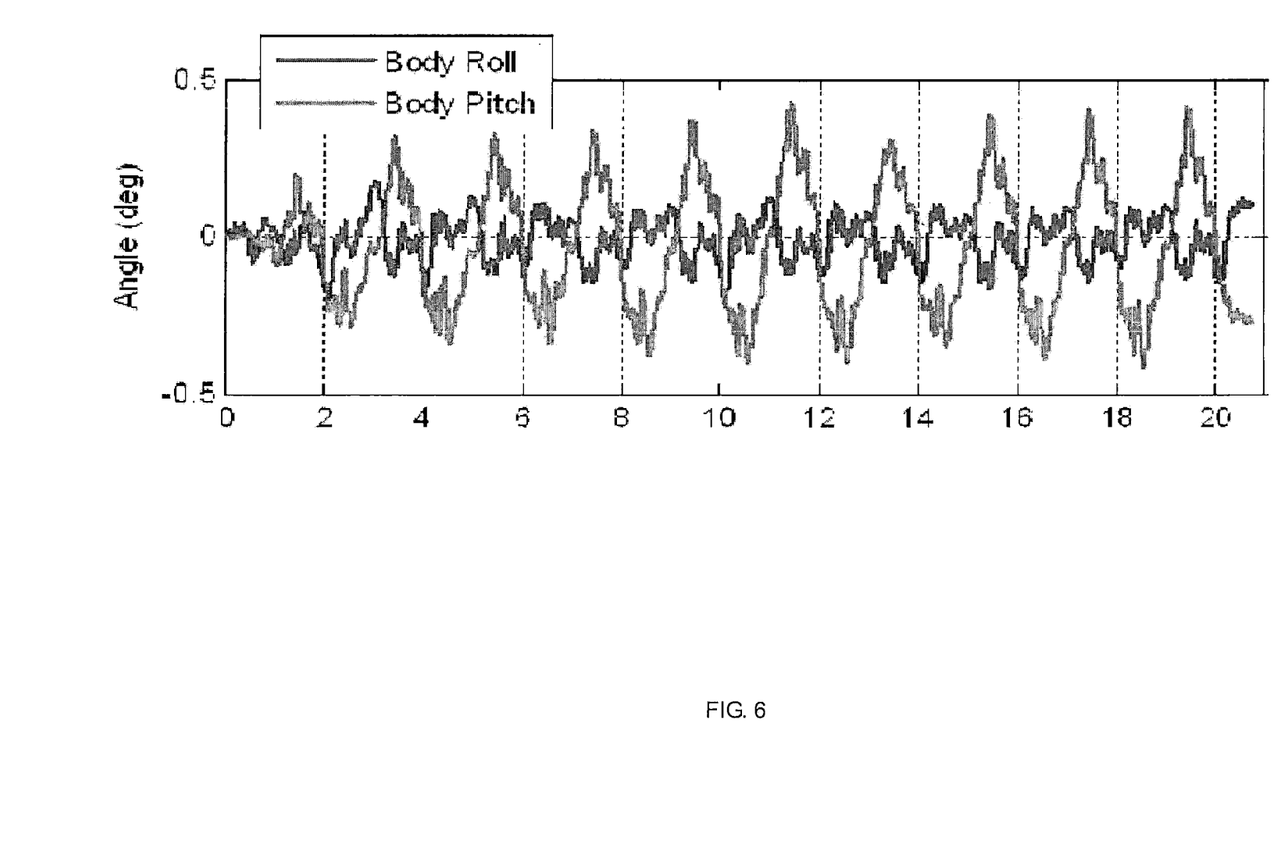
FIG. 6 is a graph showing the behavior of the main body of the biped walking robot according to the invention when the biped walking robot is walking.

FIG. 6 is a graph showing the behavior of the main body of the biped walking robot according to the invention when the biped walking robot is walking.

Referring to FIG. 6, it can be found that the body roll and body pitch of the main body of the robot respectively range between 0.5 and −0.5 degree, while the body roll and body pitch of the main body of a robot, which is not provided with the damping controller 170, the ZMP compensator 180, and the body orientation compensator 190 according to the invention, range between 3 and −3 degrees. Therefore, the motion of the main body is stabilized.

Figure 7:
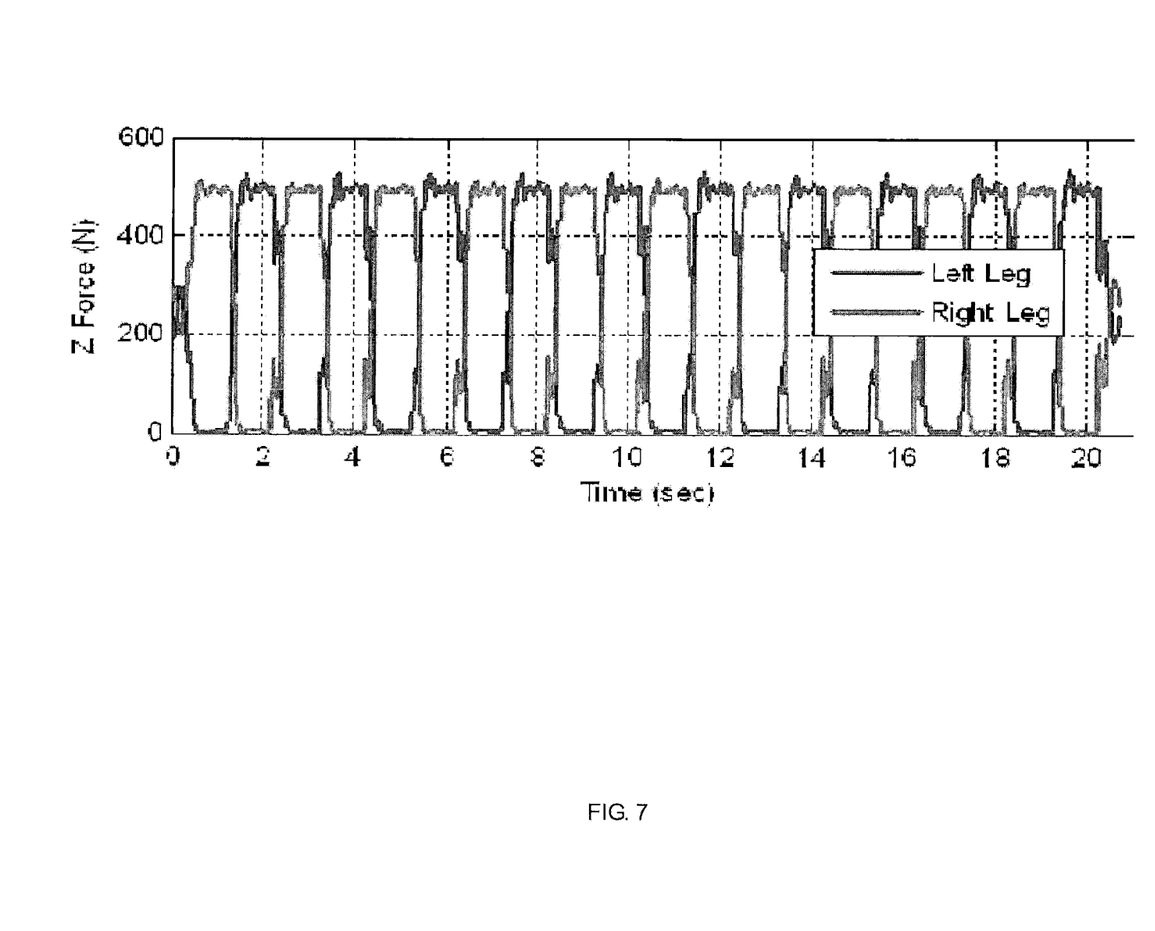
FIG. 7 is a graph illustrating the normal force acting on the foot of the biped walking robot according to the invention, when the robot is walking.

FIG. 7 is a graph illustrating the normal force acting on the foot of the biped walking robot according to the invention, when the robot is walking.

Referring to FIG. 7, the normal force changes periodically and symmetrically with respect to the left and right feet of the biped walking robot.

While the present invention has been described with reference to exemplary embodiments thereof, it will be understood by those skilled in the art that various changes and modifications in form and detail may be made therein without departing from the scope of the present invention as defined by the following claims.

The invention claimed is:

1. A method for balancing and damping control in a whole body coordination framework for a biped humanoid robot including a main body and a plurality of limbs, the method comprising the steps of:
(a) damping, by a damping controller, structural vibration of the main body of the robot caused when the robot walks;
(b) compensating for trajectories of a zero moment position (ZMP) and the center of mass (COM) of the robot which change in accordance with the damping of the structural vibration;
(c) compensating for a body orientation of the robot which changes in accordance with the damping of the structural vibration and the trajectory of the COM;
(d) designing a desired trajectory of an angular velocity of the main body of the robot as expressed by the following equation:

$$\omega_{ref}=\omega_d+T(\phi)\{k_p(\phi_d-\phi)+k_I\int(\phi_d-\phi)dt\}$$

where $\phi$ represents a body orientation angle, $\phi_d$ represents a desired body orientation angle, $k_p$ and $k_I$ are coefficients of PI control, $T(\phi)$ represents a transformation matrix, $\omega_{ref}$ represents a reference angular velocity, and $\omega_d$ represents a desired angular velocity of the main body of the robot; and outputting the desired trajectory of the angular velocity of the main body of the robot to the robot to stabilize the body orientation of the robot through feedback control.

2. The method according to claim 1, wherein in step (b), the robot is excited in a frequency band of interest by $\Delta x$ and $\Delta y$ to obtain a transfer function expressed by the following equation, and the transfer function is used to compensate for the ZMP:

$$ZMP_{\Delta x}=a_x x_{\Delta cr}-b_x \ddot{x}_{\Delta cr}, \; ZMP_{\Delta y}=a_y y_{\Delta cr}-b_y \ddot{y}_{\Delta cr}$$

where $a_i$ and $b_i$ are parameters of the transfer function.

3. An apparatus for balancing and damping control in a whole body coordination framework for a biped humanoid robot including a main body and a plurality of limbs, the apparatus comprising:
a ZMP controller;
a COM controller;
a PID controller;
a damping controller that damps a structural vibration of the main body of the robot caused when the robot is walking; and
a body orientation compensator that compensates for a body orientation of the robot which changes in accordance with the damping of the structural vibration;
wherein the body orientation compensator designs a desired trajectory of an angular velocity of the main body of the robot as expressed by the following equation:

$$\omega_{ref}=\omega_d+T(\phi)\{k_p(\phi_d-\phi)+k_I\int(\phi_d-\phi)dt\}$$

where $\phi$ represents a body orientation angle, $\phi_d$ represents a desired body orientation angle, $k_p$ and $k_I$ are coefficients of PI control, $T(\phi)$ represents a transformation matrix, $\omega_{ref}$ represents a reference angular velocity, and $\omega_d$ represents a desired angular velocity of the main body of the robot.

4. The apparatus according to claim 3, further comprising:
a ZMP compensator that compensates for trajectories of ZMP and COM in accordance with movement of the robot,
wherein the body orientation compensator compensates for the body orientation of the robot on the basis of the damping of the structural vibration and the compensated trajectories of COM and ZMP.

* * * * *